(12) United States Patent
Rousu et al.

(10) Patent No.: US 7,991,364 B2
(45) Date of Patent: Aug. 2, 2011

(54) APPARATUS METHOD AND COMPUTER PROGRAM FOR CONFIGURABLE RADIO-FREQUENCY FRONT END FILTERING

(75) Inventors: Seppo O. Rousu, Oulu (FI); Marko E. Leinonen, Haukipudas (FI); Juha P. Valtanen, Oulu (FI)

(73) Assignee: Nokia Corporation, Espoo (FI)

( * ) Notice: Subject to any disclaimer, the term of this patent is extended or adjusted under 35 U.S.C. 154(b) by 597 days.

(21) Appl. No.: 12/154,099

(22) Filed: May 19, 2008

(65) Prior Publication Data
US 2009/0286501 A1 Nov. 19, 2009

(51) Int. Cl.
*H04B 1/44* (2006.01)
(52) U.S. Cl. ............................................. 455/78
(58) Field of Classification Search ............... 455/78
See application file for complete search history.

(56) References Cited

U.S. PATENT DOCUMENTS

| | | | | |
|---|---|---|---|---|
| 6,683,513 | B2 | 1/2004 | Shamsaifar et al. | 333/135 |
| 6,912,406 | B2* | 6/2005 | Lahlum et al. | 455/553.1 |
| 7,020,186 | B2* | 3/2006 | McReynolds et al. | 375/219 |
| 7,773,956 | B2* | 8/2010 | Fukamachi et al. | 455/78 |
| 2002/0053954 | A1* | 5/2002 | Shamsaifar et al. | 333/135 |
| 2003/0022631 | A1 | 1/2003 | Rhodes et al. | 455/78 |
| 2009/0285135 | A1* | 11/2009 | Rousu et al. | 370/297 |
| 2009/0286569 | A1* | 11/2009 | Rousu et al. | 455/553.1 |

FOREIGN PATENT DOCUMENTS
EP 1 311 063 A2 5/2003

OTHER PUBLICATIONS
"A Tunable Saw Duplexer", David Penumuri, et al., IEEE Ultrasonics Symposium 2000, pp. 361-366.
"Tunable Duplexer Having Multilayer Structure Using LTCC", Kouki Saitou et al., IEEE MTT-S Digest, 2003, pp. 1763-1766.
"Tunable Filter Devices", WiSpry Digital Duplexer, 2007, 1 pg.

* cited by examiner

*Primary Examiner* — Temesgh Ghebretinsae
*Assistant Examiner* — David Bilodeau
(74) *Attorney, Agent, or Firm* — Harrington & Smith (57) ABSTRACT

A radio use case is determined for concurrently operating radios of a multi-radio device and/or transmitter and receiver of a FDD radio. A local memory is accessed with the determined use case to find a high and/or a low frequency cutoff for the concurrent operation radio or transmitter/receiver. Control signals are applied to impose the high and/or the low frequency cutoff to a pair of frequency adjustable diplexers that are in series with one another in one of a transmit branch or a receive branch of a duplexer circuit that is disposed between the radio and an antenna. Then, a receive signal is passed through the antenna and the receive branch of the duplexer circuit to the radio or receiver of the FDD radio, or a transmit signal is passed from the respective radio or transmitter of the FDD radio through the transmit branch of the duplexer circuit to the antenna.

21 Claims, 8 Drawing Sheets

| E-UTRA Band | UPLINK (UL) eNODE B RECEIVE UE TRANSMIT UL$_{FSTART}$–UL$_{FEND}$ | | DOWNLINK (DL) eNODE B TRANSMIT UE RECEIVE DL$_{FSTART}$–DL$_{FEND}$ | | UL-DL BAND SEPARATION DL$_{FSTART}$–UL$_{FEND}$ | DUPLEX MODE |
|---|---|---|---|---|---|---|
| 1 | 1920 MHz | – 1960 MHz | 2110 MHz | – 2170 MHz | 130 MHz | FDD |
| 2 | 1850 MHz | – 1910 MHz | 1930 MHz | – 1990 MHz | 20 MHz | FDD |
| 3 | 1710 MHz | – 1785 MHz | 1805 MHz | – 1880 MHz | 20 MHz | FDD |
| 4 | 1710 MHz | – 1755 MHz | 2110 MHz | – 2155 MHz | 355 MHz | FDD |
| 5 | 824 MHz | – 849 MHz | 869 MHz | – 894 MHz | 20 MHz | FDD |
| 6 | 830 MHz | – 840 MHz | 875 MHz | – 885 MHz | 35 MHz | FDD |
| 7 | 2500 MHz | – 2570 MHz | 2620 MHz | – 2690 MHz | 50 MHz | FDD |
| 8 | 880 MHz | – 915 MHz | 925 MHz | – 960 MHz | 10 MHz | FDD |
| 9 | 1749.9 MHz | – 1784.9 MHz | 1844.9 MHz | – 1879.9 MHz | 60 MHz | FDD |
| 10 | 1710 MHz | – 1770 MHz | 2110 MHz | – 2170 MHz | 340 MHz | FDD |
| 11 | 1427.9 MHz | – 1452.9 MHz | 1475.9 MHz | – 1500.9 MHz | 23 MHz | FDD |
| 12 | TBD | | TBD | | TBD | FDD |
| 13 | TBD | | TBD | | TBD | FDD |
| 14 | TBD | | TBD | | TBD | FDD |
| ... | | | | | | |
| 33 | 1900 MHz | – 1920 MHz | 1900 MHz | – 1920 MHz | N/A | TDD |
| 34 | 2010 MHz | – 2025 MHz | 2010 MHz | – 2025 MHz | N/A | TDD |
| 35 | 1850 MHz | – 1910 MHz | 1850 MHz | – 1910 MHz | N/A | TDD |
| 36 | 1930 MHz | – 1990 MHz | 1930 MHz | – 1990 MHz | N/A | TDD |
| 37 | 1910 MHz | – 1930 MHz | 1910 MHz | – 1930 MHz | N/A | TDD |
| 38 | 2570 MHz | – 2620 MHz | 2570 MHz | – 2620 MHz | N/A | TDD |

TX-RX FREQUENCY / CHANNEL BANDWIDTH / DUPLEX MODE

A  B  C  D  MODE

INPUTS FOR CONTROL UNIT

506 — FREQUENCY(A,B,C,D), MODE, CHANNEL BW, POWER LEVEL,
508 — MULTIRADIOS PRESENT, MULTIRADIO RECEPTION QUALITY

FIG.5

DIPLEXER CONTROL — FILTERING

504 — CONTROL SIGNALS
502 — CONTROL UNIT

APPARATUS METHOD AND COMPUTER PROGRAM FOR CONFIGURABLE RADIO-FREQUENCY FRONT END FILTERING

CROSS REFERENCE TO RELATED APPLICATIONS

This application is related to co-owned U.S. patent application Ser. No. 12/154,098 filed under express mailing label no. EM026579366US and entitled "Apparatus, Method and Computer Program for Radio-Frequency Path Selection and Tuning"; and also to co-owned U.S. patent application Ser. No. 12/154,100 filed under express mailing label no. EM02657983US and entitled: "Apparatus, Method and Computer Program for Interference Reduction", both of which are filed this same day and both of which are herein incorporated by reference in their entirety.

TECHNICAL FIELD

The teachings herein relate generally to wireless communication devices including components and antennas thereof that are configured to adapt bandpass filtering according to active frequency bands that are in use by one radio (e.g., transmitter and receiver of that one radio) or several radios of the device.

BACKGROUND

Following are some acronyms used in the text below and in certain of the figures:
  BTH bluetooth
  DVB-H digital video broadcasting—handheld
  EDGE enhanced data rate for GSM
  E-UTRAN evolved UTRAN (also known as 3.9 G or long term evolution LTE)
  FDD frequency division multiplex
  GPS global positioning system (e.g., Glonass, Galileo)
  GSM global system for mobile communications\
  HB high band
  ISM industrial, science, medical
  LB low band
  RF radiofrequency
  RFIC radiofrequency integrated circuit
  TDD time division duplex
  UMTS uniform mobile telecommunication system
  UTRAN universal mobile telecommunications system terrestrial radio access network
  WCDMA wideband code division multiple access
  WLAN wireless local area network
  WiMAX worldwide interoperability for microwave access Use of and research into what is termed multiradio devices is a growing trend in wireless communications. They enable the user to take advantage of increased network coverage at hotspots covered by another radio technology, they enable users to access wide area networks (e.g., traditional cellular) and more localized networks (e.g., BTH with a headset or a personal computer PC) either separately or simultaneously, and in some instances enable the wireless device to act as a mobile router for other traffic. A multiradio device user can then optimize costs by, for example, handing over to a radio technology network in which the user pays a flat rate or reduced rate as compared to other available networks, or use a free/low cost network (e.g., WLAN) to which s/he has access for more voluminous data downloads as opposed to another network that charges on a volume basis for data. Different networks may price differently for voice, data and/or broadcast, and the multiradio device can take advantage of cost arbitrage across these different networks and signal types.

When one radio transceiver needs to support multiple systems with a single hardware configuration, a needed filtering will become difficult since most of the radio systems are operating with dedicated radio frequencies. A transmitter filtering is needed to filter unintentional transmissions outside of a transmission band such as harmonics, wide band noise. A receiver filtering is needed to filter unwanted signals outside of a reception band such as blocking signals outside of reception band. Attenuation which is needed to be applied to transmission and reception signals can be derived from system specific requirements in order to maintain needed systems performance. Additionally a needed filtering also depends on whether different cellular radios of the device use the same antenna, the frequencies in use at the same antenna, and case (housing size) requirements for multiradios.

What is needed in the art is an improved filtering architecture and method to prevent interference between transmit TX and receive RX sides of a radio (or similarly between different radios of a device) that are in current use without adding the additional space and cost of independent signal pathways and related components for each of those transmitters and receivers in the radio frequency front end.

SUMMARY

In accordance with one embodiment of the invention is a circuit that includes a diplexer having a first port that interfaces a first node of the circuit to a common port of the diplexer through at least one frequency adjustable first filter that is disposed along a first radio branch, and a second port that interfaces a second node of the circuit to the common port through at least one of frequency adjustable second filter that is disposed along a second radio branch. At least one of the frequency adjustable first and second filters has a control signal input that is configured to change at least one of a filtering frequency and a filtering attenuation according to control signals input thereto.

In accordance with another embodiment of the invention is a method that includes determining a radio use case for at least one radio. In an exemplary embodiment, a radio use case is determined by at least one of transmission signal characteristics, a transmission signal power, a transmission signal quality, a transmission signal frequency, a transmission signal band width, a transmission signal modulation, number of sub carriers in transmission, a reception signal band width, number of sub carriers in reception, a reception signal modulation, FDD or TDD mode, a reception signal characteristics, a reception signal power, a reception signal quality, a reception signal frequency, activity of a transmission and/or reception. Alternatively the use case may be a multiradio use case of radios of a multi-radio device that are in concurrent operation, or transmitter and receiver of a frequency division duplex radio that are in concurrent operation. Further in the method, a memory is accessed with the determined use case to find at least one of a high frequency cutoff, a low frequency cutoff and attenuation, such as for at least one of the radios that are in concurrent operation or the transmitter and receiver that are in concurrent operation. Further in the method, control signals are applied to impose the at least one of the high and the low frequency cutoff and/or the attenuations to a selected at least one of a first frequency adjustable filter that is disposed along a first radio branch and a second frequency adjustable filter that is disposed along a second radio branch that is parallel to the first radio branch, and where each of the first and second radio branches interfaces to a diplexer. Further in the method, a communication signal is passed between the diplexer and the first or second radio branch through the at least one filter to which the control signals are applied.

In accordance with another embodiment of the invention is a memory embodying a program of computer readable instructions executable by a digital data processor to perform actions directed toward controlling frequency filtering. In this embodiment the actions include determining a radio use case for at least one of radios. A radio use case is determined by at least one of: transmission signal characteristics, a transmission signal power, a transmission signal quality, a transmission signal frequency, a transmission signal band width, a transmission signal modulation, number of sub carriers in transmission, a reception signal band width, number of sub carriers in reception, a reception signal modulation, FDD or TDD mode, a reception signal characteristics, a reception signal power, a reception signal quality, a reception signal frequency, activity of a transmission and/or reception. Alternatively the use case may be a multiradio use case of a multi-radio device of radios that are in concurrent operation or transmitter and receiver of a frequency division duplex radio that are in concurrent operation. According to this embodiment the actions further include, from the determined use case, finding in a stored database at least one of a high frequency cutoff, a low frequency cutoff and filtering attenuations for at least one of the radios or the transmitter and receiver that are in concurrent operation.The actions further encompass applying control signals to impose the at least one high frequency cutoff, low frequency cutoff and attenuation to at least one of a first frequency adjustable filter that is disposed along a first radio branch or a second frequency adjustable filter that is disposed along a second radio branch that is parallel to the first radio branch, where each of the first and second radio branches interface to a diplexer.

In accordance with another embodiment of the invention is an apparatus that includes means for interfacing a first node through a first frequency adjustable filtering means that is disposed along a first radio branch, and for interfacing a second node through a second frequency adjustable filtering means that is disposed along a second radio branch. In this embodiment, at least one of the frequency adjustable filtering means has input means for receiving control signals that operate to change at least one of a filtering frequency and an attenuation thereof. In a particular embodiment, the means for interfacing includes a frequency adjustable branching diplexer that has a first port that interfaces a first radio that is coupled to the first node, and a second port that interfaces a second radio that is coupled to the second node, and also a common port that interfaces an antenna. Further in this particular embodiment, each of the frequency adjustable filtering means is embodied as a frequency adjustable diplexer.

These and other aspects are detailed below with particularity.

DETAILED DESCRIPTION

Figure 1:
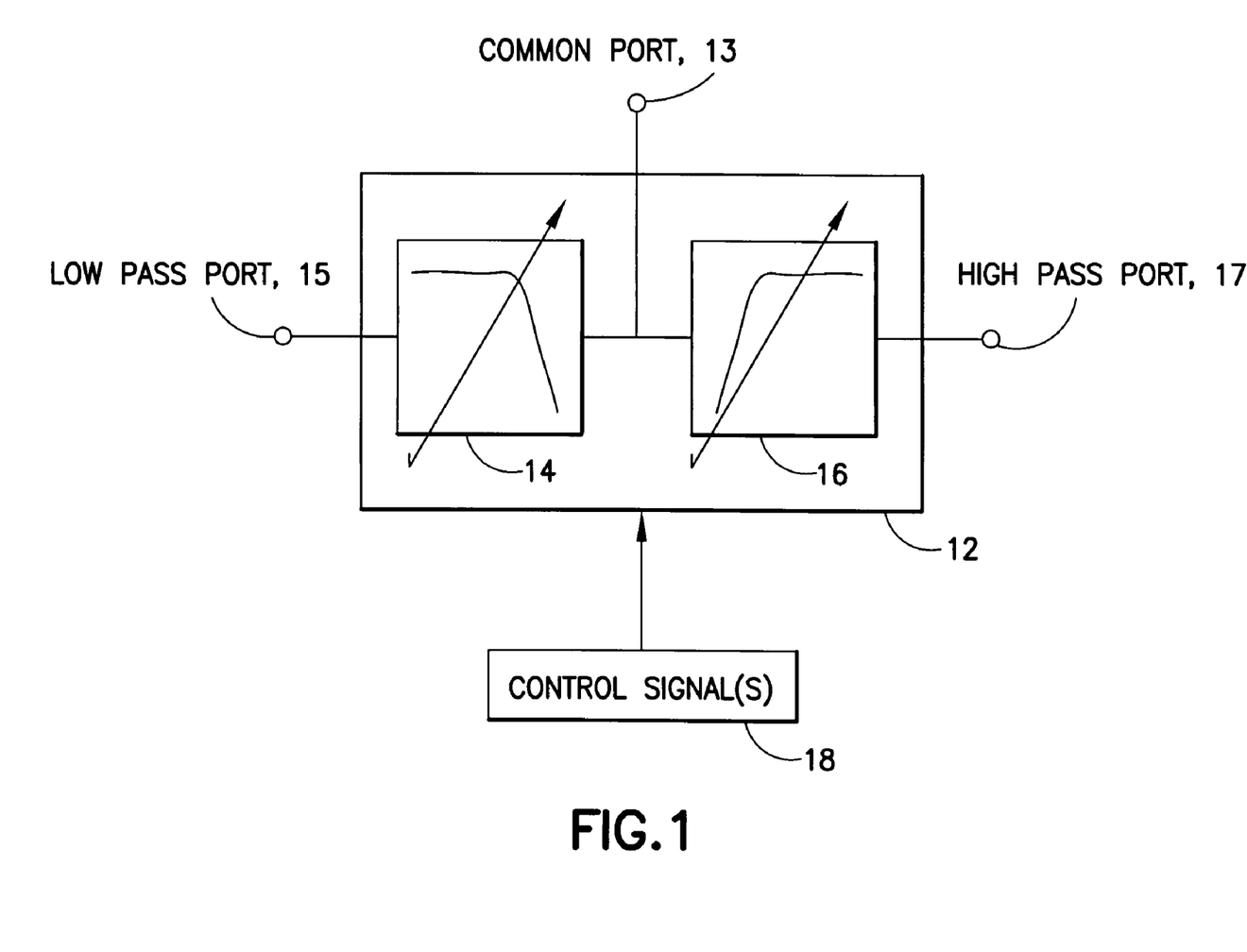
FIG. 1 illustrates a configurable diplexer having a first port

A basic diplexer circuitry block diagram 12 is shown in FIG. 1. A diplexer circuitry 12 can be implemented with a low pass filter 14 and coupled a high pass filter 16 with a coupled common port between filters. When a signal is delivered from a common port 13 of a diplexer 12, signal is divided to a low pass filter 14 and a high pass filter 16. When a signal passes a low pass filter 14 then high frequency content above a cutoff frequency of a low pass filter is filtered out. Similarly when a signal passes a high pass filter 16 then low frequency content below a cutoff frequency of a high pass filter is filtered out. Effectively a diplexer acts as a signal divider element in a frequency domain. Alternatively a diplexer can be used as a combiner element when two signals are delivered to a low pass port and a high pass port and combined signal is taken from a common port. For convenience, in FIG. 1 a first port 13 is denoted a low pass port and a second port 17 is denoted a high pass port, though by operation of the control signal(s) 18 the high/low frequency cutoffs of these ports may be reversed.

Figure 2A:
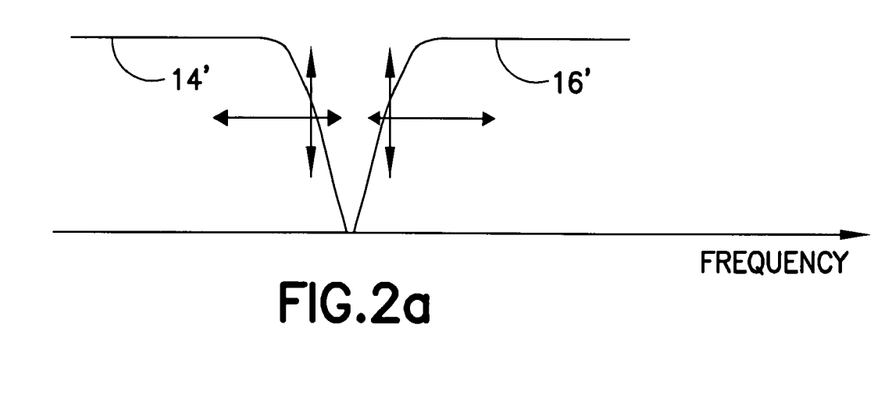
FIGS. 2a and 2b illustrates frequency domain behaviors of a configurable diplexer circuit according to an aspect of the invention

A basic diplexer operates with fixed cutoff frequencies of the filters. This kind of diplexer is suitable for systems and radios which operational frequencies are fixed and those are not needed to be altered in any operational use cases. In order to support dynamic operation a frequency response of a basic diplexer is needed to be changed. This is indicated with arrows in the filter blocks 14 and 16 in the FIG. 1.This kind of diplexer is termed a tunable diplexer. A control signal or multiple control signals may be needed in order to alter the operation of the diplexer. When control signal(s) are applied to the tunable diplexer, then at least one of frequency characteristics of a low pass or a high pass filter is altered. Frequency characteristics which can be controlled are for example a low pass filter cutoff frequency, a high pass filter cutoff frequency, a low pass filter stop band attenuation, a high band filter stop band attenuation, a slope of a transition band of a low or a high pass filter. An illustration of the frequency characteristics 14', 16' of the low 14 and high 16 pass filters of the diplexer 12 is shown in FIG. 2a. Effects of frequency characteristics changes in filters 14 and 16 are shown with arrows in FIG. 2a.

A low pass and a high pass filter may be implemented with lumped elements such as a resistors, capacitors and inductors. Alternatively suitable length transmission lines can be used to implement filters. Tunable filters can be implemented when at least one of the components of the filters 14 or 16 are replaced or at least a new additional component is added which impedance can be changed or altered based on a control signal 18 or control signals. There are several such components which impedance value can be altered presented in state of art literature e.g. PIN-diodes, capacitance diodes.

When multiple basic diplexer circuitry blocks are arranged and coupled in series to each other a duplexer filter structure can be implemented. In a duplex filter at least two different frequency signals are separated or combined to each other. A basic diplex structure can be considered as a divider in a frequency domain. A duplex filter can be considered as a frequency divider filter, which makes possible to operate a transmission and a reception functionalities of a radio simultaneously. A basic diplexer structure can operate in certain radio configuration as a duplex filter. In some configurations a basic diplexer structure need additional filter elements to fulfill duplex filter operation.

Figure 3:
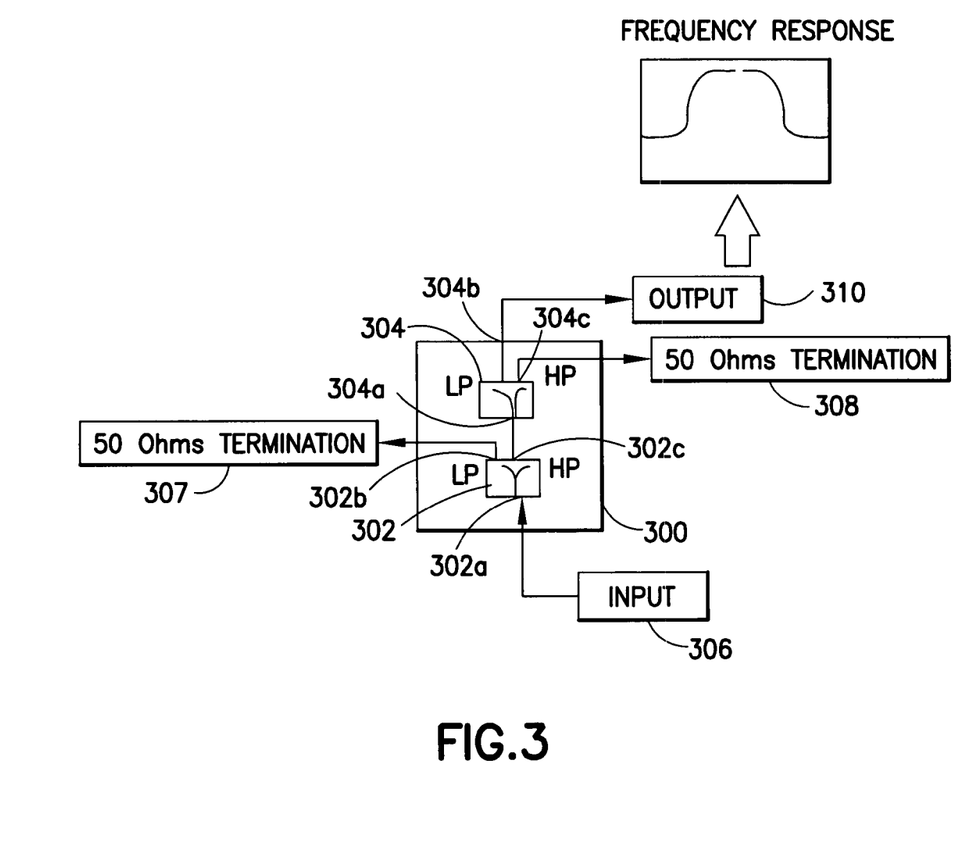
FIG. 3 is a detailed view of two configurable duplexer circuits of FIG. 1 in series with one another.

A transmission path which includes tunable diplexers is shown in FIG. 3. An equivalent principle operates on a receiver path. A first tunable diplexer 302 of the circuit structure has an input signal 306 fed to its common input port 302a; its low pass port 302b is connected to an optimal terminal load 307 (50 Ohm termination shown by example); and output from its high pass port 302c is the wanted signal. For the first tunable diplexer 302, the corner frequency of the high pass port 302c is lower than the wanted signal frequency that is output there, and the corner frequency of the low pass port 302b is higher than the wanted signal frequency. Transmissions outside of the transmission band are considered out-of-band transmission which needs to be filtered out. The diplexer 302 acts as a high pass filter for wanted signal and it filters wide band noise below transmission signal. The termination load 307 impedance can be altered if needed in order to guarantee suitable termination impedance for the unwanted signals. In some cases termination load can be different than 50 ohms for example if a termination load impedance matching at certain frequency is needed to be done to a complex conjugate.

Figure 5:
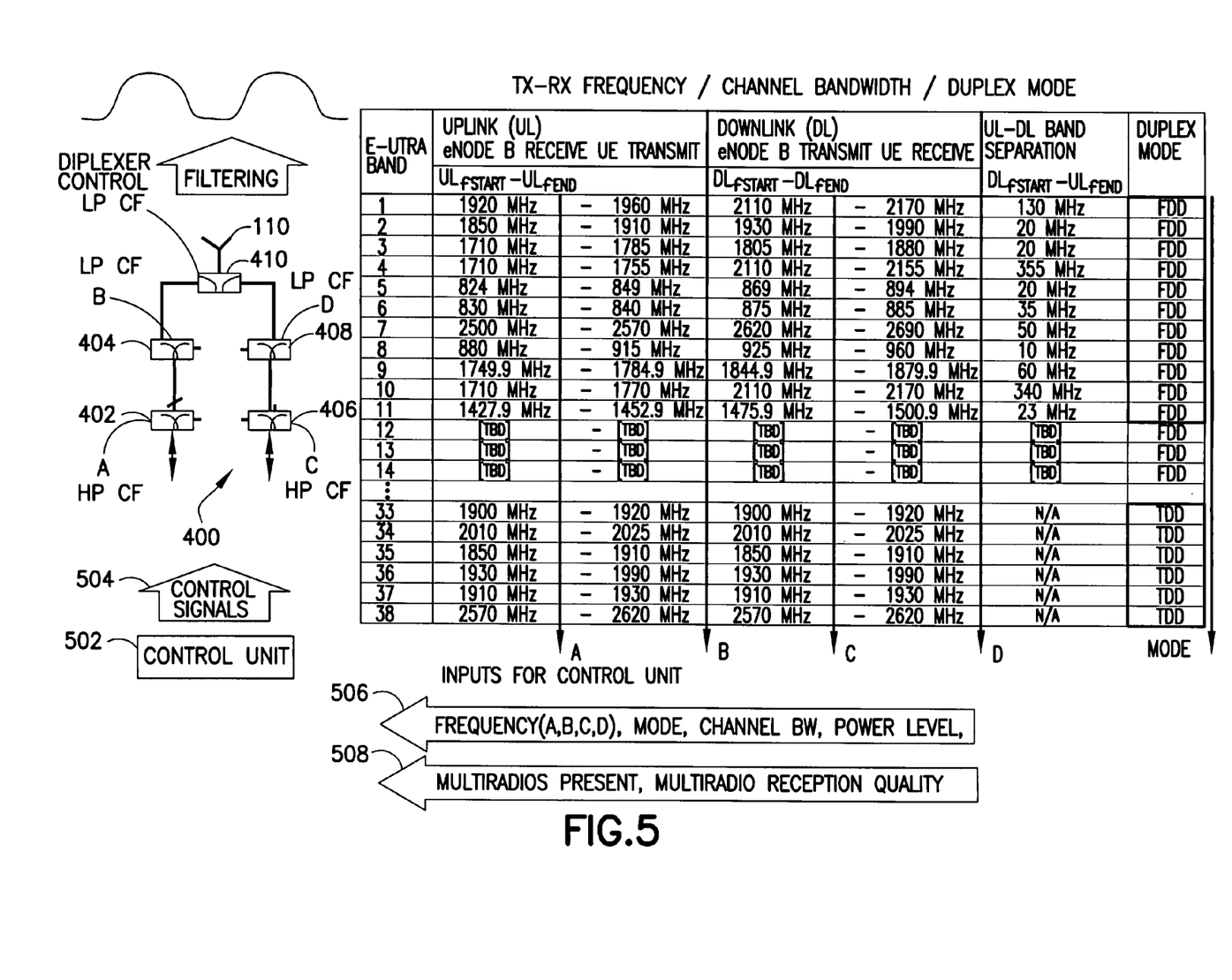
FIG. 5 illustrates control signal generation which configure the corner frequencies of the various diplexers of the configurable duplexer circuit of FIG. 5a for E-UTRAN frequency bands.
Figure 6:
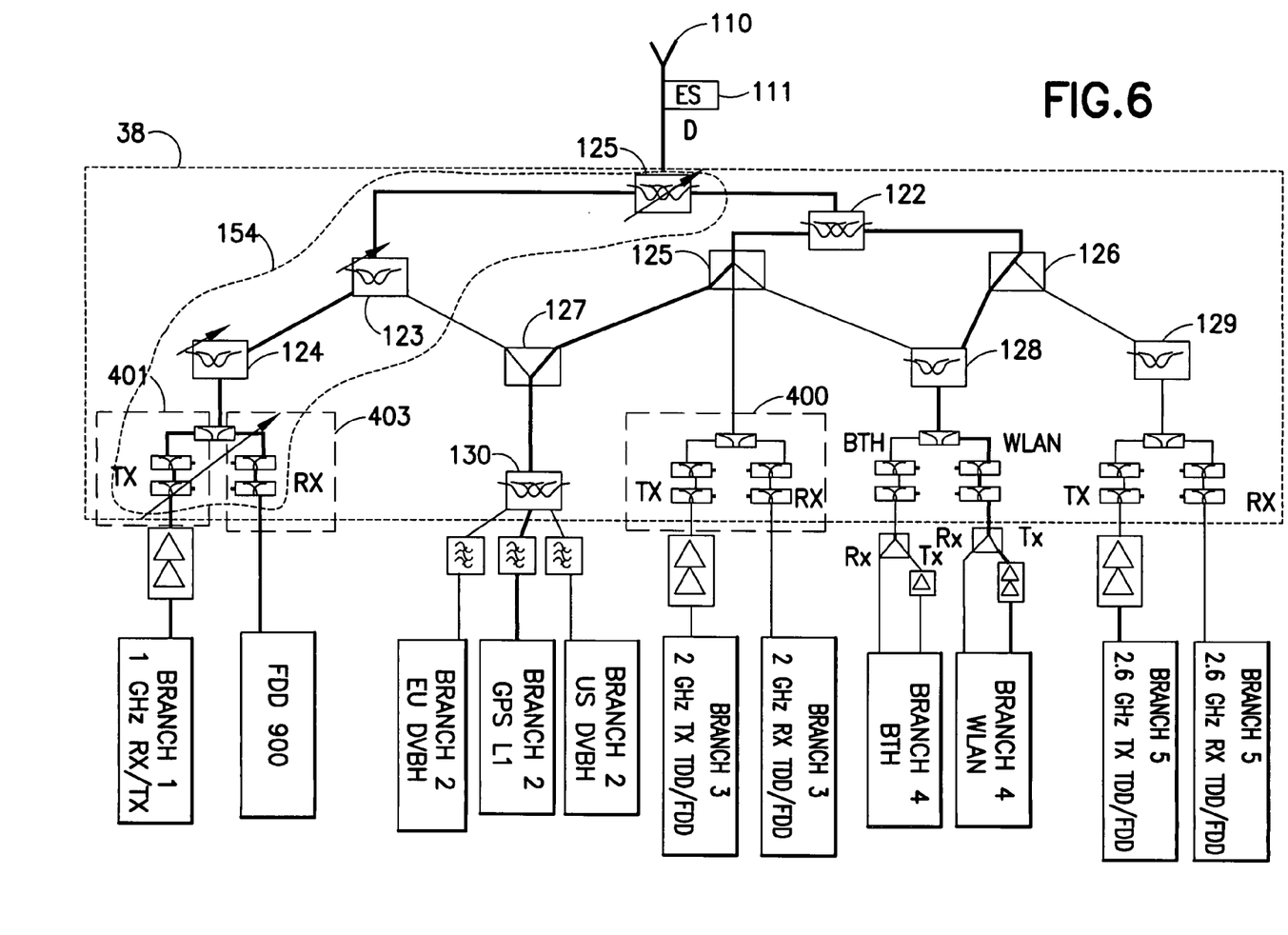
FIG. 6 illustrates a configurable duplexer circuit according to an aspect of the invention in each of three radio branches of the RF front end of a multiradio device having five radios.

The second tunable diplexer 304 is in series with the first diplexer 302 along that same transmit path of the configurable duplexer circuit 300. The high-pass port 302c of the first tunable diplexer 302 is coupled to a common input port 304a of the second frequency tunable diplexer 304. The high-pass port 304c of the second tunable diplexer 304 is connected to another optimal termination load 308, according to harmonic extraction and termination loading (50 Ohm termination shown by example). This is an alternative configuration for the duplex filtering to improve out-of-band performance e.g. a wide band noise filtering outside of a transmission band. The wanted signal that is output from the high pass port 302c of the first frequency tunable diplexer 302 therefore passes through the second tunable diplexer 304 via the common input port 304a and the low pass filter port 304b, which is coupled to the next component (e.g., the various diplexers 124, 123, 121 as shown in FIG. 6, or directly to the antenna 110). The output signal 310 then exhibits a frequency response as shown in FIG. 5 and the arrangement acts as a notch filter, clipping the low band at the first diplexer 302 and clipping the high band at the second diplexer 304. But importantly, the exact frequency cutoff for that clipping are set by the control signals 18, and varies depending on the use case and the potential interfering frequencies other active radios might be using. As above, these control signals can change on a slot-by-slot basis (slot referring to a basic transmit/receive TX/RX time interval for any of the active radios of any given use-case) based on the RX/TX activity of the other active radios that may potentially interfere. Thus, the control signals to the diplexers 302, 304 of the configurable duplexer circuit 300 depend on the use-case (radios, TX or RX being active) and the mode (TDD or FDD) of the active radios of the use-case.

Figure 2B:
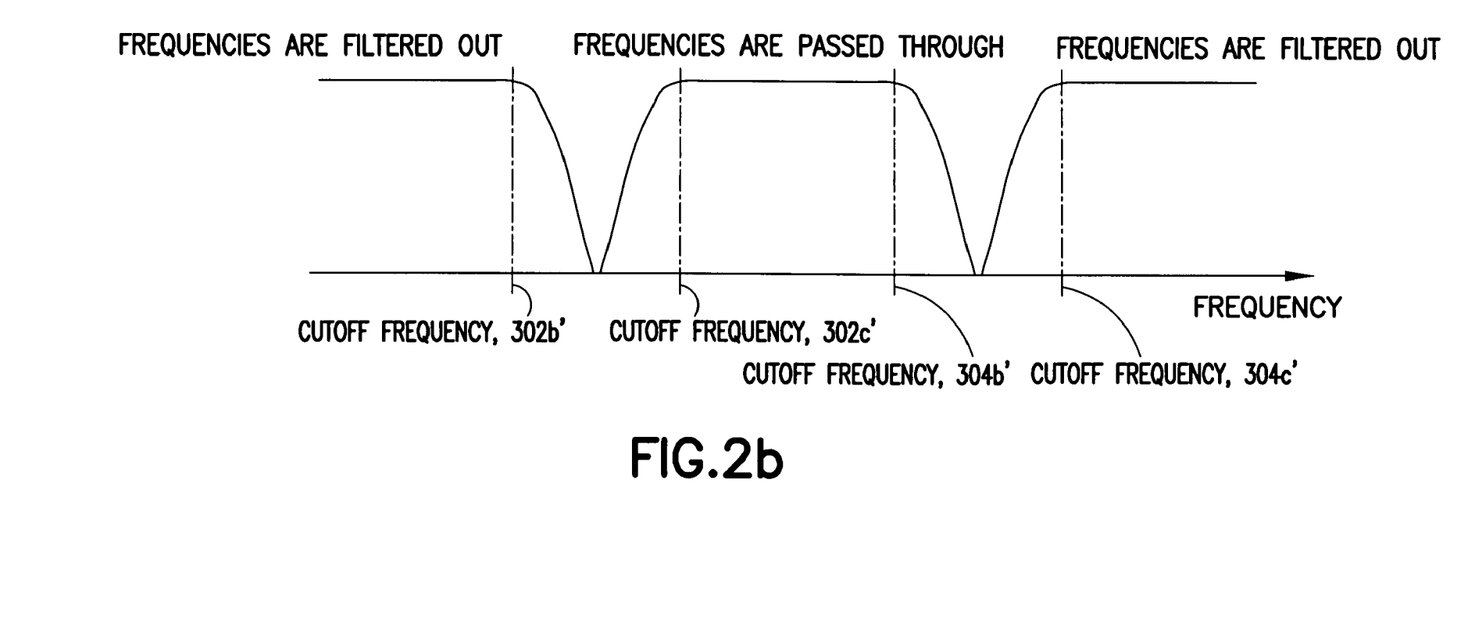

An illustration of the frequency response for output 310 of the diplexer arrangement 300 for a pass through signal is shown in FIG. 2b. Signals which are below and above a transmission band are filtered out with diplex structures and thus transmission signal will not transmit unwanted transmissions outside of the allowed transmission band. The cutoff frequencies 302b', 302c', 304b' and 304c' correspond to the ports 302b, 302c, 304b and 304c, respectively.

Figure 4A:
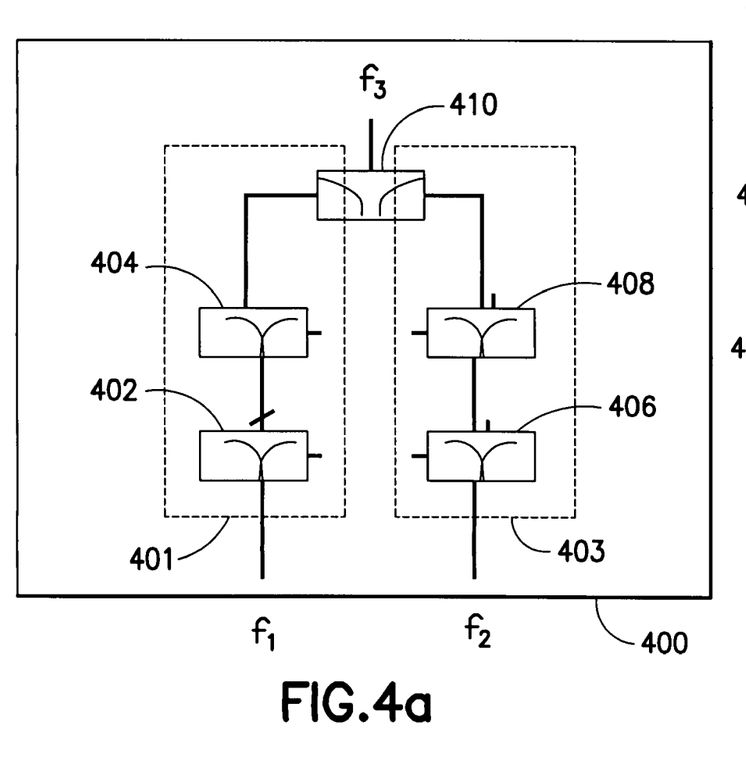
FIGS. 4a and 4b show further details of the configurable duplexer circuit of FIG. 3.

FIG. 4a illustrates another embodiment of the configurable duplexer circuit 400 in isolation, where opposite nodes of a branching diplexer 410 are within the respective transmit path 401 and receive path 403. The series pair of diplexers 402/404 and 406/408 in those paths 401, 403 operate as detailed generally for the TX path at FIG. 3, and the adjustability of the filtering parameters/cutoff frequencies enable FDD and TDD cellular systems to perform band filtering using the same transmission chain. Further, the same configurable filter pair can be used for WCDMA/LTE FDD and TDD modes without switches at the input or the output side. In TDD operation, the filter pair not being actively used at a particular instant in time is moved out of operation band. The same receiver pins/contacts in the RFIC 38 can be used in both TDD and FDD modes for the receiver and also for the transmitter. The TDD and FDD modes can both use the same antenna interface. Cellular bands and modes at different frequency ranges can use the same configurable filtering pair.

The branching diplexer 410 has a common port that interfaces to the antenna 110 (FIG. 4b), and while one antenna is shown the multi-radio device may have more than the single illustrated antenna to which at least one of the radios are coupled, such as for MIMO (multiple input multiple output) operation. The transmit branch of the branching diplexer interfaces a transmitter of the radio along the radio branch in which the duplexer circuit is disposed to the first port of the branching diplexer. The receive branch of the branching diplexer interfaces a receiver of that same radio to the second port of the branching diplexer. In this manner the branching diplexer selectively (either at separate times or simultaneously, depending on FDD or TDD mode) interfaces the transmitter and receiver of one of the radios of the multi-radio apparatus to the antenna. Control signals are derived from a local memory that stores an association of the use case, including the mode, with the high and the low frequency cutoffs for the pair of frequency adjustable diplexers in the transmit branch and in the receive branch. Similarly, control signals may also be applied to the branching diplexer so that the respective first port of second port passes the frequency band selected by the high and low cutoff frequencies imposed at the series pair of diplexers in the transmit or receive branch. Thus the high and low cutoff frequencies in the series pair of diplexers act as a passband or notch filter for the appropriate transmit or receive band.

Each filter 402, 404, 406, 408 can be a transmit TX or a receive RX filter, which enables use in the typical case where the TX frequency is lower than the RX frequency and also in the atypical case where the RX frequency is lower than the TX frequency (e.g. WCDMA/LTE band VIII has a TX freq lower than the RX freq; UMTS 700 has the RX freq lower than the TX frequency). When the use case changes and a diplexer is connected into an active path, it needs to be configured. The relative filtering on the physical branches of the radio frequency integrated circuit RFIC may be swapped (e.g., branch 1 may swap from LB to HB while branch 2 swaps from HB to LB, or vice versa). But the same receiver pins in the RFIC 38 (FIG. 6) can be used in both instances for the receiver and for the transmitter. Additionally, the filter band width can be adjusted according to the transmission bandwidth in current use (e.g. UMTS band I 60 MHz, band II 40 MHz, etc). These filter parameters may be readily implemented in software, stored in a local memory of the multiradio device as a lookup table or an algorithm that gives the control signals to set the proper frequency cutoffs for any given use case. And as above, these controls can re-configure the diplexers according to the current use case on a slot-by-slot basis to enable both FDD and TDD. Additional information for a selection and adjustment for filter parameters can be obtained from other active radio block radio characteristics integrated into a device.

Figure 4B:
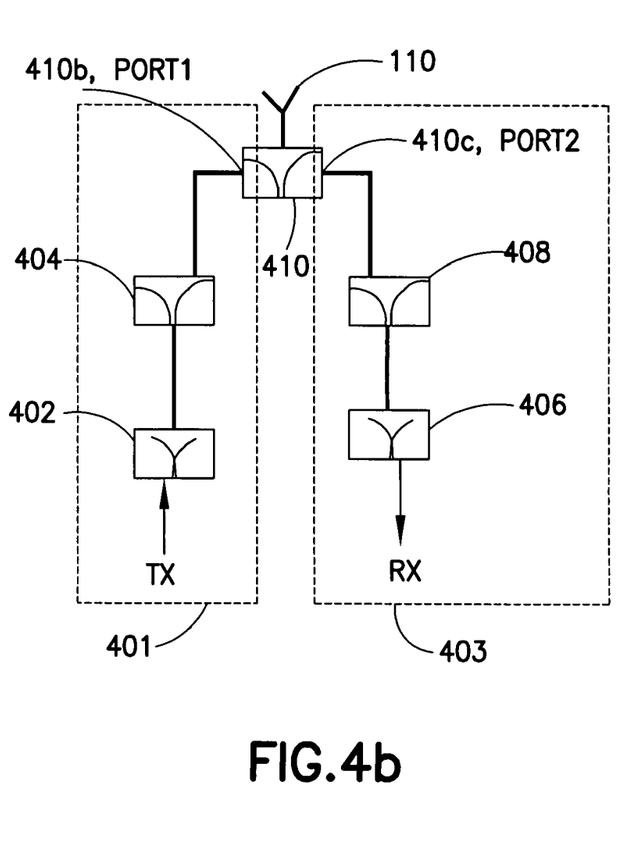

At FIG. 4b the TX/RX branching diplexer 410 is shown with its common port coupled to an antenna 110 and with its TX port 410b coupled to the TX tunable diplexerfilter pair 402/404; and also with its RX port 410c coupled to the other RX tunable diplexer pair 406/408. The tunable diplexer cutoff frequency is at a frequency range between the filter pair's pass bands so as to provide normal duplex separation in the FDD mode. The ports are fully configurable by the control signals, so for example the branching diplexer 410 can be configured in one instance (shown) to have low pass filtering at Port1 410b and to have high pass filtering at Port2 410c, and can be configured in another instance so that Port1 410b has high pass filtering and Port2 410c has low pass filtering. As above, this enables the multiradio to function without additional hardware for the use case where the TX frequency is lower or higher than the RX duplex separation in FDD. Thus the RX and TX parts 401,403 may be reversed as to RX or TX in practice, depending on the specific use-case involved.

The TDD functionality can be enabled by configuring the diplex filter pairs to have equal pass bands with different scheduling to enable TDD functionality. Or the band filters can have different pass bands at the same allocated band (e.g. BTH, WLAN). It is clear then that the band filter can cover the whole allocated band, and can cover only the communication channel frequencies currently in operation.

A diplexer arrangement is detailed at co-owned US Patent Application entitled: "Apparatus, Method and Computer Program for Radio-Frequency Path Selection and Tuning" (cross-referenced above), and as shown at FIG. 6 is a convenient platform on which embodiments of the invention disclosed herein may be adapted as a companion sub-circuit to the overall radiofrequency front end integrated circuit RFIC 38, an application specific integrated circuit ASIC). Alternatively to the single common antenna 110 shown there, individual antennas can be assigned to the various radios. The particularized description generally details the invention in the context of transmit pathways in which the radios are transmitters, but these teachings also extend to the companion receive pathways in which the radios are receivers (alternatively or in combination). The term radio/branch as used herein therefore includes transmitters, receivers, and transceivers.

There are five radio branches shown at FIG. 6 supporting eight radios with a comprehensive RFIC 38. They are by example one cellular radio on branch 1 operating at a center frequency of 1 GHz or thereabouts [e.g., low band 3 G/4 G (900 MHz)], another cellular radio on branch 3 shown in two blocks for FDD and TDD modes and operating at a center frequency of 2 GHz or thereabouts [e.g., high band GSM (1800/1900), certain WCDMA frequencies]; and still another cellular radio on branch 5 shown in two blocks for FDD and TDD modes and operating at a center frequency of 2.6 GHz or thereabouts (e.g., certain E-UTRAN or certain WCDMA frequencies). There are also shown at FIG. 6 what are termed complementary radios, shown by example as a BTH and WLAN radios at branch 4 and operating at a center frequency of about 2.4 GHz; and a DVB-H radio (EU and US versions shown separately) and a GPS radio on branch 2.

Also in FIG. 6 is a tunable antenna diplexer 112; various path-switching tunable diplexers 122, 123, 124, 128, 129; and switches 125, 126, 127. These are particularly detailed at co-owned US Patent Application entitled: "Apparatus, Method and Computer Program for Radio-Frequency Path Selection and Tuning" (cross-referenced above) as selecting different active signal pathways for the various radio branches to the antenna using control signals that set phase/frequency filtering characteristics of the tunable diplexers according to the radio use case. Where the switches 125, 126, 127 are simple switches and not implemented as tunable diplexers themselves, they are simply switched to complete the signal pathway selected by the tunable diplexer frequency characteristics.

It is noted that there are different use cases as to radios of the multiradio device in active use and also the mode of any of those active radios as to frequency division duplex FDD mode or time division duplex TDD mode. Specifically, WCDMA in the TDD mode is becoming commercialized, and existing RF front end circuit designs do not take into account the TDD mode because they were designed for FDD mode only. Some space and cost savings may accrue if one were to use the same (or largely the same) RF pathways/branches for both TDD and FDD modes. Due to WCDMA TDD and FDD at different frequency bands, a dedicated TDD filter would appear to be necessary to adapt prior art solutions for FDD. But since WCDMA TDD transmit and receive signals are at the same frequency, duplicate filters can be avoided but some switching will be necessary to implement the prior art FDD transceivers for WCDMA TDD functionality. In a multiradio device the interference frequency can be lower or higher than the transmit frequency, depending on the use case that includes radio mode FDD orTDD. Both TDD and FDD modes are present also in an E-UTRAN communication system. In one system embodiment TDD may be implemented on FDD TX band and on alternative embodiment TDD system may be implemented on FDD RX band. Merely adding additional filtering adds hardware and increases current consumption, always a concern in portable radio devices and particularly in high-draw multiradio devices. Note that this problem, and the solution herein to it, is not limited only to multi-radio devices; a mobile WCDMA device may have only a single radio with multiple modes TDD and FDD. But the solution to the single radio/multiple mode problem extends nicely for general use in a multiradio device as will be evident from the description below. In a coming 3 GPP release there will be discontinuous feature also for FDD system, which enables certain time pauses when the terminal does not need to have transmission active. In embodiments of the present invention there may be arranged brakes in FDD transmission with compressed mode feature, and these moments may be used for scheduling controlling filtering arrangement.

To address these additional concerns for FDD and TDD modes, embodiments of the invention presented below implement variable filtering according to the transmission and reception bandwidth for the radios in use (the use-case), or for the case of a single radio, for the mode (TDD or FDD, TX or RX) of that radio in use. Of course for a multiradio device where at least one of the radios has both FDD and TDD modes, one such use case includes both the radios in use and the mode in use of the multimode radio. Note that the invention is not limited to resolving the TDD/FDD dichotomy in WCDMA; that is simply provided as an exemplary environment with which to describe aspects of the invention. In exemplary environment some filters may be fixed frequency filter.

Consider again FIG. 6, in which the RFIC 38 selectively couples various combinations of the five radios (detailed below) to the antenna 110. Active radios for this exemplary use case are shaded. According to an embodiment of the invention there is a configurable duplexer circuit 400, which is shown in each of branches 1, 3, 4 and 5, that enables variable filtering of the transmit and receive paths of each radio along the respective branch. This variable filtering depends on the use case for radios currently in operation at any given moment in time. Specific filter parameters can be optimized for the use case and set by control signaling to the duplexers and filters of the configurable duplexer circuit 400 as will be detailed, not unlike the control signaling 18 shown at FIG. 1 but which depends on the radio use case for FIGS. 2a-b. The configurable duplexer circuit 400 is shown as separate TX and RX sub-components at branch 1 of FIG. 6, and offset by a box and reference number 400 only at branch 3 of FIG. 6 through the same circuit structures are also shown on branches 4 and 5.

Specifically, the filtering and response for one radio of the multiradio device, for example the filtering and response for the cellular radio on branch 1 and offset by the dotted line 401 or 403, can be changed according to the other active radios, but by these embodiments such change can be imposed at the slot rate or anytime there is a change to the transception activity (e.g., from TX to RX or vice versa) of any other active radio such as the WLAN radio on branch 4 which may change from active TX as shown in FIG. 6 to active RX. Since as shown in FIG. 6 the branch 1 radio is a WCDMA radio operating in the FDD mode, both TX pathway 401 and RX pathway 403 within the configurable duplexer circuit 400 are bold, indicating active. The WLAN radio on branch 4 is TDD, and as shown in FIG. 6 the WLAN radio is active only in the TX branch. As will be evident below, one or more terminations may be readily combined with any of the adjustable diplexer components within the configurable duplexer circuits 400 for the band filtering that occurs on each of the transmit 401 and receive 403 paths.

In the specific example shown at FIG. 6, the radios are as follows. The radio on branch 1 is at low (1 GHz) cellular frequencies (e.g., low band LB GSM/EDGE, WCDMA/LTE (bands V, VI, VIII, XII, XII, XIV). The radios on branch 2 are complementary radios (e.g., European Union EU L-band DVB-H, US DVB-H, GPS L1, L2, and L5 frequencies, WCDMA/LTE band XI). The radios on branch 3 are at cellular mid band (2 GHz) frequencies (e.g., GSM/EDGE, WCDMA/LTE bands I, II, III, IV, IX, X). The radios on branch 4 are also complementary radios (e.g., Bluetooth BTH, WLAN). The radios on branch 5 are at high cellular (2.6 GHz) frequencies (e.g., WCDMA/LTE band VII). All frequencies are rounded for brevity.

FIG. 5 includes a table of start and stop radio frequencies for various frequency bands in E-UTRAN, taken from 3 GPP TR 36.803 v0.4.0 (2007-06) at table 5.2.1. Shown are the uplink and downlink frequency cutoffs for the various E-UTRAN bands, with FDD or TDD indicated at the rightmost column. A control unit 502 such as the digital processor described with reference to FIG. 7 outputs control signals 504 to the various diplexers of the configurable duplexer circuit 400, where each path (diplexer series-pair) can be transmit or receive as indicated by the bi-directional arrows. Since the control signals 504 depend from the E-UTRAN bands of the table, this particular configurable duplexer circuit 400 is disposed along a branch on which the E-UTRA radio lies between that radio and the antenna 110.

Further, embodiments of this aspect of the invention are not limited to multiradio devices but may be implemented in a portable device having just one radio such as the E-UTRAN cellular radio of FIG. 5. In that case the transmit and receive pins of the radio are coupled to the common port of the respective diplexers, shown by the bidirectional arrows in FIG. 5, and enable the radio to operate in FDD and TDD modes over the various frequency bands without changing the path from radio to antenna in both FDD cases where the TX frequency is higher than the RX frequency and when the TX frequency is lower than the RX frequency (e.g., E-UTRAN bands 1-40). However, implementation within a multiradio device is seen to solve a much more difficult problem than it would in a single radio device.

Input signals 506 to the control unit 502 include by at least one of a transmission signal characteristics, a transmission signal power, a transmission signal quality, a transmission signal frequency, a transmission signal band width, a transmission signal modulation, number of sub carriers in transmission, a reception signal band width, number of sub carriers in reception, a reception signal modulation, a reception signal characteristics, a reception signal power, a reception signal quality, a reception signal frequency, activity of a transmission and/or reception, the frequency of those E-UTRA bands, FDD or TDD mode, (other inputs might also be used). Further inputs 508 to the control unit 502 designate the use case for the multiradios in use; which are active, whether active in TX or RX or both, whether a radio is operating in TDD or FDD mode (which is closely related to TX or RX activity), etc. Signal reception quality may also be an input. Lower and upper frequency thresholds (subscripts fstart and fend, respectively) for the various E-UTRA bands are designated by letters A, B, C and D to more clearly show correspondence with the appropriate diplexer of the circuit 400. In alternative embodiment start and stop frequencies of transmission and reception channels may be used as input for filtering corner frequencies to increase stop band attenuation between transmission and reception frequencies.

For example, assume band 4 of FIG. 5 is in use. The control signals 504 associated with line A of the table would configure diplexer 402 to pass frequencies higher than 1710 MHz, which is the low frequency threshold for the uplink/transmit of band 4. The control signals 504 associated with line B of the table would configure diplexer 404 to pass frequencies lower than 1755 MHz, which is the high frequency threshold for the uplink/transmit of that same band 4. A signal from the transmitter would then be clipped through diplexers 402 and 404 to remain within only the wanted frequency band 1710-1755 MHz. The control signals set diplexer 402 as a high pass filter with corner frequency CF of 1710, and set diplexer 404 as a low pass filter with CF of 1755. Clearly these can be reversed with the same result; control signals for line B can be used to configure diplexer 402; and those for line A can be used to configure diplexer 404.

Now consider the receiver path for that same band 4, since it is a FDD mode whereby TX and RX can occur simultaneously in the same E-UTRA radio. The control signals 504 associated with line D of the table would configure diplexer 408 to pass frequencies lower than 2155 MHz, which is the high frequency threshold for the downlink/receive of band 4. The control signals 504 associated with line C of the table would configure diplexer 406 to pass frequencies higher than 2110 MHz, which is the low frequency threshold for the downlink/receive of that same band 4. A signal from the antenna 110 to the receiver would then be clipped through diplexers 408 and 406 to remain within only the wanted frequency band 2110-2155 MHz. These control signals set diplexer 408 as a low pass filter with corner frequency CF of 2155, and set diplexer 406 as a high pass filter with CF of 2110. As with the transmitter side, these C & D control signals can be sent to the different diplexers in the receive chain than noted above and achieve the same result.

As can be seen, simply changing the control signals 504 can adapt the configurable duplexer circuit 400 for any of the bands, including bands not listed where the RX frequency is lower than the TX frequency. For the case where the configuration is changed from RX higher than TX to TX higher than RX, in one port (that in the transmit path) of the branching diplexer circuit 510 switching from being the low frequency port to being the high frequency port, and the opposite port (that in the receive path) switching from being the high frequency port to being the low frequency port. Because it can be implemented for a specific radio technology via software for the control signals, the same hardware element (the circuit 400) can be used in many different multiradio architectures and for many different types of radios, and multiple embodiments of the circuit 400 could advantageously be present in a single multiradio device. Analogically certain embodiments may be implemented following FDD/TDD band allocations; TDD is on FDD TX band or TDD is on FDD RX band.

So from the above it is clear that the filter bandwidth (across a series filter-pair) is adjusted according to interoperability at the same band (e.g., BTH & WLAN, UMTS2300 TDD), and according to interoperability with an adjacent band (e.g. LTE 2.6 GHz & WLAN). Out of band emission filtering can be started already at the communication channel edge by implementing as in FIG. 6 using the band edges as filter corner frequencies.

The configurable duplexer circuit 400 enables a radio in FDD mode to support both fixed and variable TX to RX frequency separation, which is specified at section 5.3 of 3 GPP TS 25.101 but which to the inventors' knowledge is not solved by any other prior art architecture. The circuit 400 can be used to adjust for out of band attenuation, which can be considered a trade off with pass band attenuation according to the power level, which is why in some embodiments the power level is an input to the control unit 502 that determines the appropriate control signals 504. The same tradeoff can also consider the multiradio use case and received signal strength indication RSSI. A portion of the circuit 400, such as that shown at FIG. 3, can be readily implemented in receiver-only radios (e.g., DVB-H, GPS), and the overall comprehensive RX/TX circuit 400 as in FIGS. 4a-b can be implemented with transceiver radios (e.g., GSM, BTH, WLAN).

Figure 7:
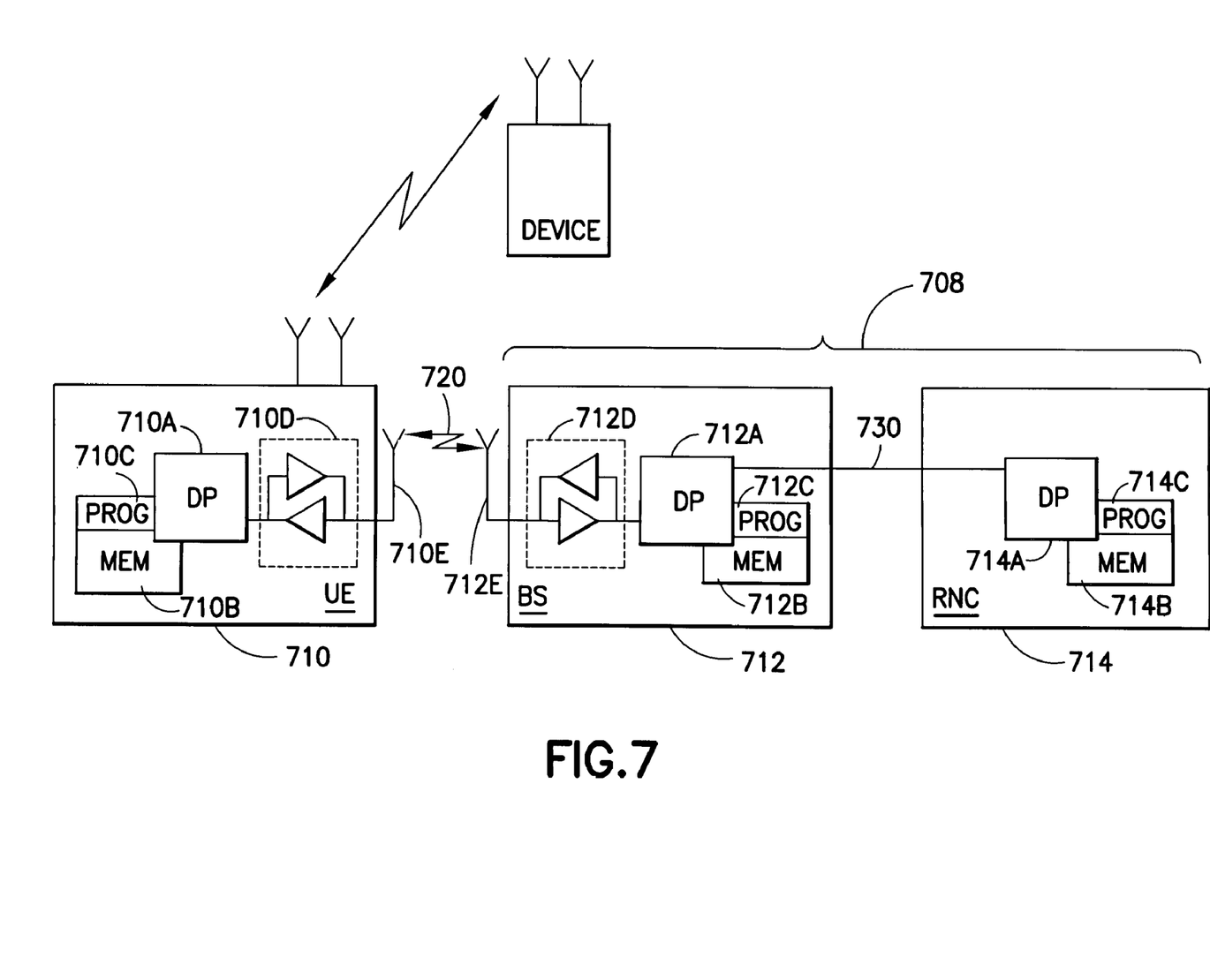
FIG. 7 is a simplified schematic block diagram showing various electronic devices that are suitable for use in practicing the exemplary embodiments of the invention.

Reference is now made to FIG. 7 for illustrating a simplified block diagram of various electronic devices that are suitable for use in practicing the exemplary embodiments of this invention. In FIG. 7 a wireless network 708 is adapted for communication between a UE 710 and a Node B 712 (e-Node B). The network 708 may include a gateway GW/serving mobility entity MME/radio network controller RNC 714 or other radio controller function known by various terms in different wireless communication systems. The UE 710 includes a data processor (DP) 710A, a memory (MEM) 710B that stores a program (PROG) 710C, and either a multi-mode radio or a plurality (one shown) of suitable radio frequency (RF) radios (receivers, transmitters, or transceivers) 710D coupled to one or more antennas 710E for bidirectional wireless communications over one or more wireless links 720 with the Node B 712.

The term "coupled" means any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 712 also includes a DP 712A, a MEM 712B, that stores a PROG 712C, and one or more (one shown) suitable RF radios (receivers, transmitters, or transceivers) 712D coupled to one or more antennas 712E (one shown but typically an antenna array). The Node B 712 may be coupled via a data path 730 (e.g., Iub or S1 interface) to the serving or other GW/MME/RNC 714. The GW/MME/RNC 714 includes a DP 714A, a MEM 714B that stores a PROG 714C, and a suitable modem and/or transceiver (not shown) for communication with the Node B 712 over the Iub link 730.

In one environment, the UE 710 uses its multiradios configured according to an embodiment of this invention to communicate to a plurality of network nodes such as the BS 712 each using one or more different radios, examples of which are detailed above. In another environment, both the UE 710 and the Node B 712 communicate with one another using different ones of the multiradios, and both the UE 710 and the Node B 712 include an embodiment of this invention. In yet another environment, a single Node B 712 according to an embodiment of this invention communicates with different UEs 710 using different ones of its multradios. In another embodiment, the UE 710 communicates with the Node B 712 using a single multi-mode radio in FDD and TDD modes. In another embodiment UE 710 may communicate with terminal and also with network element at same time. In one embodiment UE 710 may operate as relay element between $2^{nd}$ terminal(s) and network element.

At least one of the PROGs 710C, 712C and possibly 714C (for the case where the data link 730 is wireless and communication between the MME 714 and the Node B 712 is via multiradios) is assumed to include program instructions that, when executed by the associated DP, enable the electronic device to operate in accordance with the exemplary embodiments of this invention, as detailed above. Inherent in the DPs 710A, 712A, and 714A is a clock to enable synchronism among the various apparatus for transmissions and receptions within the appropriate time intervals and slots required.

The PROGs 710C, 712C, 714C may be embodied in software, firmware and/or hardware, as is appropriate. In general, the exemplary embodiments of this invention may be implemented by computer software stored in the MEM 710B and executable by the DP 710A of the UE 710 and similar for the other MEM 712B and DP 712A of the Node B 712, or by hardware, or by a combination of software and/or firmware and hardware in any or all of the devices shown.

In general, the various embodiments of the UE 710 can include, but are not limited to, mobile stations, cellular telephones, relays, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 710B, 712B and 714B may be of any type suitable to the local technical environment and may be implemented using any suitable data storage technology, such as semiconductor-based memory devices, magnetic memory devices and systems, optical memory devices and systems, fixed memory and removable memory. The DPs 710A, 712A and 714A may be of any type suitable to the local technical environment, and may include one or more of general purpose computers, special purpose computers, microprocessors, digital signal processors (DSPs) and processors based on a multi-core processor architecture, as non-limiting examples. Further in this regard it should be noted that the various logical step descriptions below may represent program steps, or interconnected logic circuits, blocks and functions, or a combination of program steps and logic circuits, blocks and functions.

Figure 8:
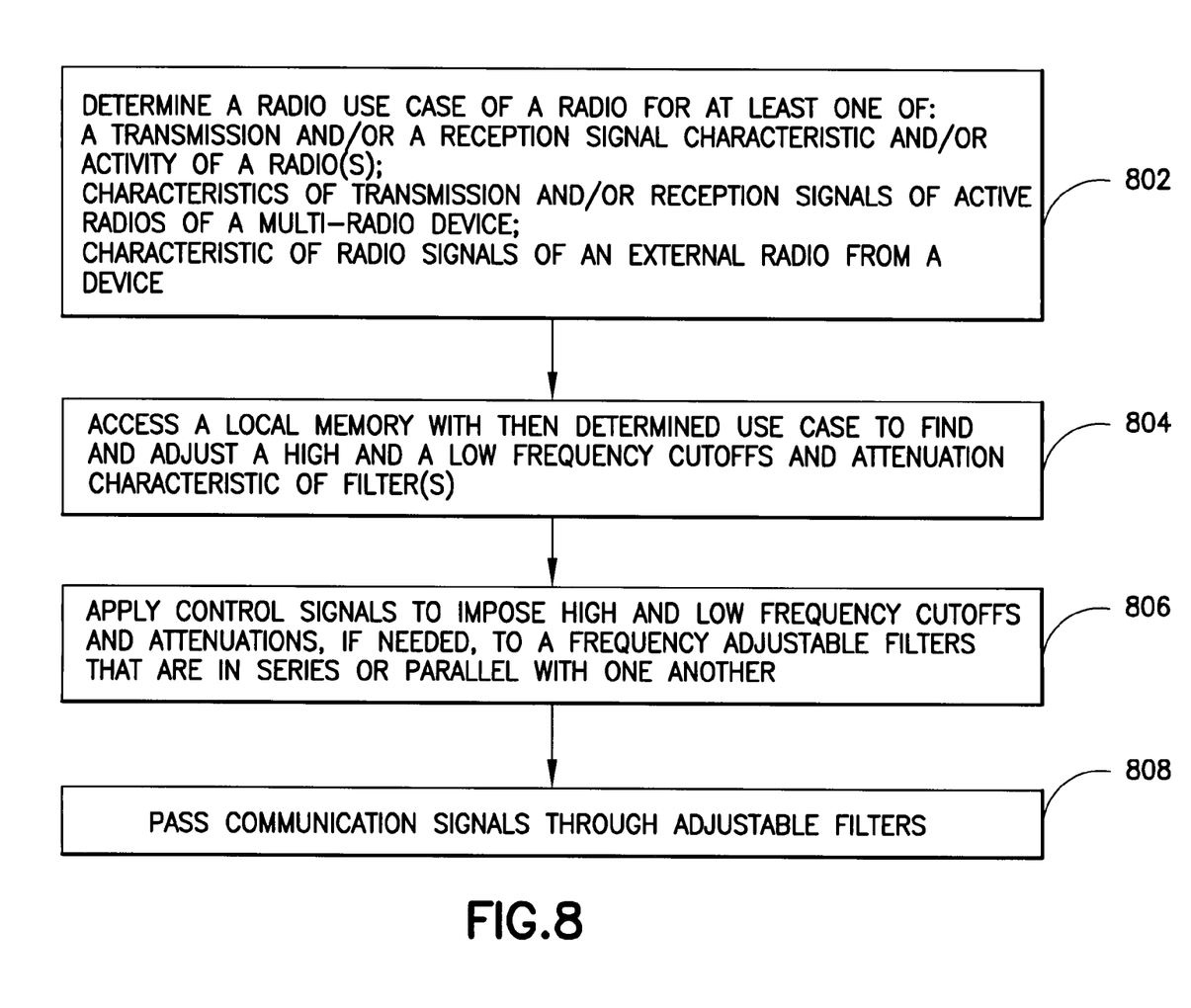
FIG. 8 is a flow diagram representing process steps or functional circuitry to implement an embodiment of the invention.

Such logical steps are shown at FIG. 8. At block 802 a radio use case is determined for radios. A radio use case may be defined by characteristics and/or activity of a radio. A radio use case determination may done with information at least one of characteristics of a transmission signal characteristics, a transmission signal power, a transmission signal quality, a transmission signal frequency, a transmission signal band width, a transmission signal modulation, number of sub carriers in transmission, a reception signal band width, number of sub carriers in reception, a reception signal modulation, FDD or TDD mode, a reception signal characteristics, a reception signal power, a reception signal quality, a reception signal frequency, activity of a transmission and/or reception. Additionally a radio use may include a multi-radio device radio information that are in concurrent operation or a multi-mode radio (where transmitter and receiver are in concurrent operation as in FDD mode). For the case where at least one radio of a multi-radio device is multi-mode, then both radios and use and mode are considered for determining the use case. Additionally if a radio has capabilities to observe and classify radio signals external to a radio, then information of an external radio activity and signal characteristics may be used as an input for radio use case definition. For example if a radio notify a external radio which interferes the receiver of the radio, then additional filtering may be needed top of typical filtering based on a look up table filtering. Alternatively if a second radio is activated during the operation of the radio, then a radio use case in changed and a new or adjusted filtering may be needed. At block 804 a local memory is accessed with the determined use case to find and adjust a high and a low frequency cutoff for a respective at least one of the radios that are in concurrent operation or transmitter and receiver. The memory has an association of radio use case to frequency cutoffs, such as is shown at FIG. 6. Additionally block 804 may include pre-determined attenuations for the high and the low pass filters. The predetermined attenuations may be need to altered based on activity and signals external to the radio. At block 806 control signals are applied to impose the high and the low frequency cutoff and/or attenuations to a pair of frequency adjustable diplexers that are in series with one another. This can be in the transmit branch or in the receive branch of a duplexer circuit that is disposed between the respective one of the radios of the use-case and an antenna or the multi-mode radio and the antenna for the FDD mode when both transmitter and receiver are on simultaneously for the use case the control signals are imposed to effect different notch filters at both the transmit branch and the receive branch of the duplexer circuit, as well as frequency selective control signals at the first and second ports of the branching diplexer. Finally, now that the passbands are set for the diplexer series pair of the active branch(es) for the radio use case, at block 808 for communication signal operation. A receive signal is passed through the antenna and through the receive branch of the duplexer circuit to the active radio of the use case. Alternatively, for the opposite TDD case where the transmit branch is active or for the FDD case where both transmitter and receiver of the same radio are active at the same time, a transmit signal is passed from the active radio through the transmit branch of the duplexer circuit to the antenna. It should be noted that in some cases only one diplexer is enough for ensuring the duplex operation and in these cases a single diplexers acts as a pair of diplexers presented previously.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A circuit comprising:
   a diplexer having a first port interfacing a first node of the circuit to a common port of the diplexer through at least one frequency adjustable first filter disposed along a first radio branch, and a second port interfacing a second node of the circuit to the common port through at least one frequency adjustable second filter disposed along a second radio branch;
   wherein the said diplexer comprises a branching diplexer and the at least one frequency adjustable first filter comprises a frequency adjustable first diplexer and a frequency adjustable second diplexer, arranged in series with one another such that either:

a high pass port of the first diplexer interfaces to the second diplexer and a low pass port of the second diplexer interfaces to the first port of the branching diplexer, and further wherein a low pass port of the first diplexer interfaces to a first termination and a high pass port of the second diplexer interfaces to a second termination; or a low pass port of the second diplexer interfaces to the first diplexer and a high pass port of the first diplexer interfaces to the first port of the branching diplexer, and further wherein a high pass port of the second diplexer interfaces to a first termination and a low pass port of the first diplexer interfaces to a second termination;

wherein at least one of the first and second filters has a control signal input configured to change at least one of a filtering frequency and filtering attenuations according to control signal input thereto.

2. The circuit of claim 1, arranged according to at least one of the following: the first node is coupled to a first receiver and the second node is coupled to a second receiver; the first node is coupled to a first transmitter and the second node is coupled to a second transmitter; and the first node is coupled to a first transmitter and the second node is coupled to a second receiver of a different radio than the first transmitter.

3. The circuit of claim 1, wherein at least one of the first and second filters is configured to change its filtering frequency at least as often as a slot rate defined by the radio.

4. The circuit of claim 1, wherein the control signal inputs are coupled to a processor that provides the control signals according to a radio use case table stored in a local memory of an apparatus in which the circuit and the processor are disposed.

5. The circuit of claim 4, wherein the radio use case depends on at least one of: frequency bands of radios in use, transmission signal characteristics, a transmission signal power, a transmission signal quality, a transmission signal band width, a transmission signal modulation, number of sub carriers in transmission, a reception signal band width, number of sub carriers in reception, a reception signal modulation, frequency versus time division duplex mode, a transmission signal frequency, reception signal characteristics, a reception signal power, a reception signal quality, a reception signal frequency, and activity of a transmission and/or reception and frequency division duplex or time division duplex mode of a radio in use.

6. The circuit of claim 1, wherein the common port of the diplexer interfaces to an antenna.

7. The circuit of claim 1, wherein the at least one frequency adjustable second filter comprises a frequency adjustable fourth diplexer and a frequency adjustable fifth diplexer, arranged in series with one another such that either:

a high pass port of the fourth diplexer interfaces to the fifth diplexer and a low pass port of the fifth diplexer interfaces to the first port of the branching diplexer; or a low pass port of the fifth diplexer interfaces to the fourth diplexer and a high pass port of the fourth diplexer interfaces to the first port of the branching diplexer.

8. The circuit of claim 1, further wherein the diplexer is frequency adjustable according to control signals so as to pass frequency bands selected by the frequency adjustable filters of the first radio branch and of the second radio branch.

9. A method comprising:
determining a radio use case for a radio;
accessing a memory with the determined use case to find at least one of a high frequency cutoff, a low frequency cutoff and filtering attenuations;
applying control signals to impose the at least one of the high frequency cutoff, the low frequency cutoff and the filtering attenuations to at least one of a first frequency adjustable filter that is disposed along a first radio branch and a second adjustable filter that is disposed along a second radio branch that is parallel to the first radio branch, each of the first and second radio branches interfacing to a diplexer;
wherein the said diplexer comprises a branching diplexer and the at least one first frequency adjustable filter comprises a first diplexer and a second diplexer, arranged in series with one another such that either:

a high pass port of the first diplexer interfaces to the second diplexer and a low pass port of the second diplexer interfaces to a first port of the branching diplexer, and further wherein a low pass port of the first diplexer interfaces to a first termination and a high pass port of the second diplexer interfaces to a second termination; or a low pass port of the second diplexer interfaces to the first diplexer and a high pass port of the first diplexer interfaces to the first port of the branching diplexer, and further wherein a high pass port of the second diplexer interfaces to a first termination and a low pass port of the first diplexer interfaces to a second termination; and passing a communication signal between the diplexer and the first or second radio branch through the at least one filter to which the control signals are applied.

10. The method of claim 9, wherein determining the radio use case, accessing the memory, and applying the control signals is at least as often as a slot rate defined by a radio coupled to the first or second radio branch.

11. The method of claim 9, wherein the radio use case depends on at least one of: frequency bands of radios in use, transmission signal characteristics, a transmission signal power, a transmission signal quality, a transmission signal frequency, a transmission signal band width, a transmission signal modulation, number of sub carriers in transmission, a reception signal band width, number of sub carriers in reception, a reception signal modulation, frequency versus time division duplex mode, reception signal characteristics, a reception signal power, a reception signal quality, a reception signal frequency, and activity of a transmission and/or reception and frequency division duplex or time division duplex mode of at least one of the radios.

12. The method of claim 9, wherein the first radio branch interfaces a first port of the diplexer to a first radio or to a transmitter of a frequency division duplex radio, the second radio branch interfaces a second port of the diplexer to a second radio or to a receiver of the frequency division duplex radio, and a common port of the diplexer interfaces to an antenna.

13. The method of claim 9, wherein applying the control signals to impose the at least one of the high frequency cutoff, the low frequency cutoff and the filtering attenuations further comprises applying a second set of control signals to impose at least one of a second high frequency cutoff, a second low frequency cutoff and second filtering attenuations to the other of the at least one first and second frequency adjustable filters.

14. The method of claim 9, wherein applying the control signals further comprises applying control signals to a frequency adjustable diplexer that comprises the first or second frequency adjustable filter so that the frequency adjustable diplexer passes a frequency band between the high and the low frequency cutoffs.

15. A memory embodying a program of computer readable instructions executable by a digital data processor to perform actions directed toward controlling frequency filtering, the actions comprising:

determining a radio use case for a radio;

from the determined use case, finding in a stored database at least one of a high frequency cutoff, a low frequency cutoff and filtering attenuations for at least one frequency adjustable filter; and applying control signals to impose the at least one of the high frequency cutoff, the low frequency cutoff and the filtering attenuations to at least one of a first frequency adjustable filter disposed along a first radio branch or a second frequency adjustable filter disposed along a second radio branch that is parallel to the first radio branch, each of the first and second radio branches interfacing to a diplexer, wherein the said diplexer comprises a branching diplexer and the at least one first frequency adjustable filter comprises a first diplexer and a second diplexer, arranged in series with one another such that either:

a high pass port of the first diplexer interfaces to the second diplexer and a low pass port of the second diplexer interfaces to a first port of the branching diplexer, and further wherein a low pass port of the first diplexer interfaces to a first termination and a high pass port of the second diplexer interfaces to a second termination; or a low pass port of the second diplexer interfaces to the first diplexer and a high pass port of the first diplexer interfaces to the first port of the branching diplexer, and further wherein a high pass port of the second diplexer interfaces to a first termination and a low pass port of the first diplexer interfaces to a second termination.

16. The memory of claim 15, wherein determining the radio use case, finding in the stored database, and adjusting and applying the control signals is at least as often as a slot rate defined by a radio coupled to the first or second radio branch.

17. The memory of claim 15, wherein the radio use case depends on at least one of: frequency bands of radios in use, transmission signal characteristics, a transmission signal power, a transmission signal quality, a transmission signal frequency, a transmission signal band width, a transmission signal modulation, number of sub carriers in transmission, a reception signal band width, number of sub carriers in reception, a reception signal modulation, frequency versus time division duplex mode, reception signal characteristics, a reception signal power, a reception signal quality, a reception signal frequency, activity of a transmission and/or reception and frequency division duplex or time division duplex mode of at least one of the radios.

18. The memory of claim 15, wherein the first radio branch interfaces a first port of the diplexer to a first radio or to a transmitter of a frequency division duplex radio, the second radio branch interfaces a second port of the diplexer to a second radio or to a receiver of the frequency division duplex radio, and a common port of the diplexer interfaces to an antenna.

19. The memory of claim 15, wherein applying the control signals to impose the at least one of the high frequency cutoff, the low frequency cutoff and the filtering attenuations to the at least one of the first and the second frequency adjustable filters further comprises applying a second set of control signals to impose at least one of a second high frequency cutoff, a second low frequency cutoff and a second filtering attenuations to the other of the first and second frequency adjustable filters.

20. The memory of claim 15, wherein applying the control signals further comprises applying control signals to at least one of a frequency adjustable filter that comprises the first or second frequency adjustable filter so that the diplexer passes a frequency band between the high and the low frequency cutoffs.

21. An apparatus comprising:

means for interfacing a first node through a first frequency adjustable filtering means disposed along a first radio branch, and for interfacing a second node through a second frequency adjustable filtering means disposed along a second radio branch;

wherein at least one of the first and second frequency adjustable filtering means has input means for receiving control signals that operate to change at least one of a filtering frequency and an attenuation thereof; wherein the means for interfacing comprises a frequency adjustable branching diplexer having a first port interfacing a first radio that is coupled to the first node, a second port interfacing a second radio that is coupled to the second node, and a common port interfacing an antenna;

each of the frequency adjustable filtering means comprises a frequency adjustable filter and has a control input for receiving the control signals; and the frequency adjustable filtering means comprises a frequency adjustable first diplexer and a frequency adjustable second diplexer, arranged in series with one another such that either:

a high pass port of the first diplexer interfaces to the second diplexer and a low pass port of the second diplexer interfaces to the first port of the branching diplexer, and further wherein a low pass port of the first diplexer interfaces to a first termination and a high pass port of the second diplexer interfaces to a second termination; or a low pass port of the second diplexer interfaces to a first diplexer and a high pass port of the first diplexer interfaces to the first port of the branching diplexer, and further wherein a high pass port of the second diplexer interfaces to a first termination and a low pass port of the first diplexer interfaces to a second termination.

* * * * *